(12) United States Patent
Davison

(10) Patent No.: US 6,279,695 B1
(45) Date of Patent: Aug. 28, 2001

(54) INTEGRATED AXLE SPINDLE AND BRAKE SPIDER

(75) Inventor: Kent Davison, Columbia City, IN (US)

(73) Assignee: Dana Corp., Toledo, OH (US)

( * ) Notice: Subject to any disclaimer, the term of this patent is extended or adjusted under 35 U.S.C. 154(b) by 0 days.

(21) Appl. No.: 09/694,257

(22) Filed: Oct. 24, 2000

Related U.S. Application Data

(63) Continuation of application No. 09/323,127, filed on Jun. 1, 1999, now Pat. No. 6,148,968.

(51) Int. Cl.[7] .................................................. F16D 65/09
(52) U.S. Cl. ................................... 188/206 A; 301/124.1
(58) Field of Search ........................... 188/205 R, 206 A, 188/206 R; 301/124.1, 125, 131, 132

(56) References Cited

U.S. PATENT DOCUMENTS

| | | |
|---|---|---|
| 2,084,814 | 6/1937 | Lejeune . |
| 3,037,818 | 6/1962 | Scheel . |
| 3,749,415 | 7/1973 | Sampatacos . |
| 4,445,597 * | 5/1984 | Baltare ............................. 188/206 A |
| 4,455,732 | 6/1984 | Shiets . |
| 4,552,254 * | 11/1985 | Baltare ................................ 188/328 |
| 4,768,839 | 9/1988 | Spindler . |
| 4,792,080 | 12/1988 | Ferrari . |
| 4,858,730 * | 8/1989 | Baroni .............................. 188/206 A |
| 4,967,584 | 11/1990 | Sato et al. . |
| 5,219,176 | 6/1993 | Mitchell . |
| 5,301,774 * | 4/1994 | Cho et al. ......................... 188/206 A |
| 5,303,985 | 4/1994 | Barnholt et al. . |
| 5,435,793 * | 7/1995 | Varela et al. .......................... 180/244 |

* cited by examiner

*Primary Examiner*—Christopher P. Schwartz
(74) *Attorney, Agent, or Firm*—Liniak, Berenato, Longacre & White

(57) ABSTRACT

An integrated axle spindle and brake spider assembly for axles of heavy duty vehicles such as trucks, and trailer axles. The assembly is a one-piece member comprising a cylindrical hollow axle spindle and a brake spider extending radially outwardly from the axle spindle. The brake spider includes an actuator support plate provided with a support opening for a brake actuator cam shaft, and a pivoting end support plate provided with a pair of pivot pin bores receiving brake shoe supporting pivot pins. The integrated axle spindle and brake spider assembly is manufactured from a single steel alloy billet as a one-piece forging. The one-piece assembly reduces the overall weight of the component, cost of manufacturing, and improves positioning accuracy of brake components and structural integrity.

7 Claims, 3 Drawing Sheets

INTEGRATED AXLE SPINDLE AND BRAKE SPIDER

This application is a continuation of Ser. No. 09/323,127 filed on Jun. 1, 1999, now U.S. Pat. No. 6,148,968.

FIELD OF THE INVENTION

The present invention relates to an axle spindle provided with an integrated brake spider, and more specifically to the axle spindle for trucks and trailer axle configurations.

BACKGROUND OF THE INVENTION

The brake spider serves as a foundation for a brake assembly, designed to support the various elements of the brake assembly. In conventional axle assemblies, the brake spiders of the foregoing type have been produced from weldable steel alloys and formed by forging, stamping, casting or the like. Then, the spider is welded to the stationary axle spindle of a vehicle.

The example of the prior art axle end assembly that is typical for the type of brake found in heavy duty trucks and trailers, is illustrated on FIG. 1. The assembly includes an axle tube 1 and a brake spider 2 typically forged from weldable steel alloys. The brake spider 2 is secured to the axle tube 1 usually by welding. The welding joint between the axle tube 1 and the brake spider 2 is indicated generally by reference numeral 4. A spindle 3 is attached to the axle tube 1 also usually by welding. The welding joint between the axle tube 1 and the spindle is indicated generally by reference numeral 5.

Welding, however, is relatively expensive and labor intensive operation, Furthermore, the slightest deviation in the welding operation could cause misalignment between the brake spider and spindle bearing journals. Thus, the brake positioning accuracy could suffer, that degrades brake performance and wear characteristics.

SUMMARY OF THE INVENTION

The present invention alleviates the drawbacks of the prior art. The present invention replaces an axle spindle and brake spider assembly manufactured from two separate forged parts, namely the axle spindle and the brake spider, fixed by welding, with a single piece assembly incorporating the axle spindle and brake spider that are forged together.

The advantage of the present invention is that the one-piece assembly eliminates the welding operation and reduces the cost of manufacturing of the axle spindle and brake spider assembly, and simplifies assembly into the vehicle.

Another advantage of the present invention is that it reduces the overall weight of the component.

Yet another advantage of the present invention is that the one-piece forging provides substantially greater structural integrity and improved stiffness comparatively to the prior art assemblies using multiple components welded together.

Further advantage of the present invention is that the integration of the axle spindle and the brake spider drastically improves positioning accuracy of the brake components providing greater accuracy of location of the brake spider holes and spindle bearing journals that results in improved brake performance and wear characteristics.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 2:
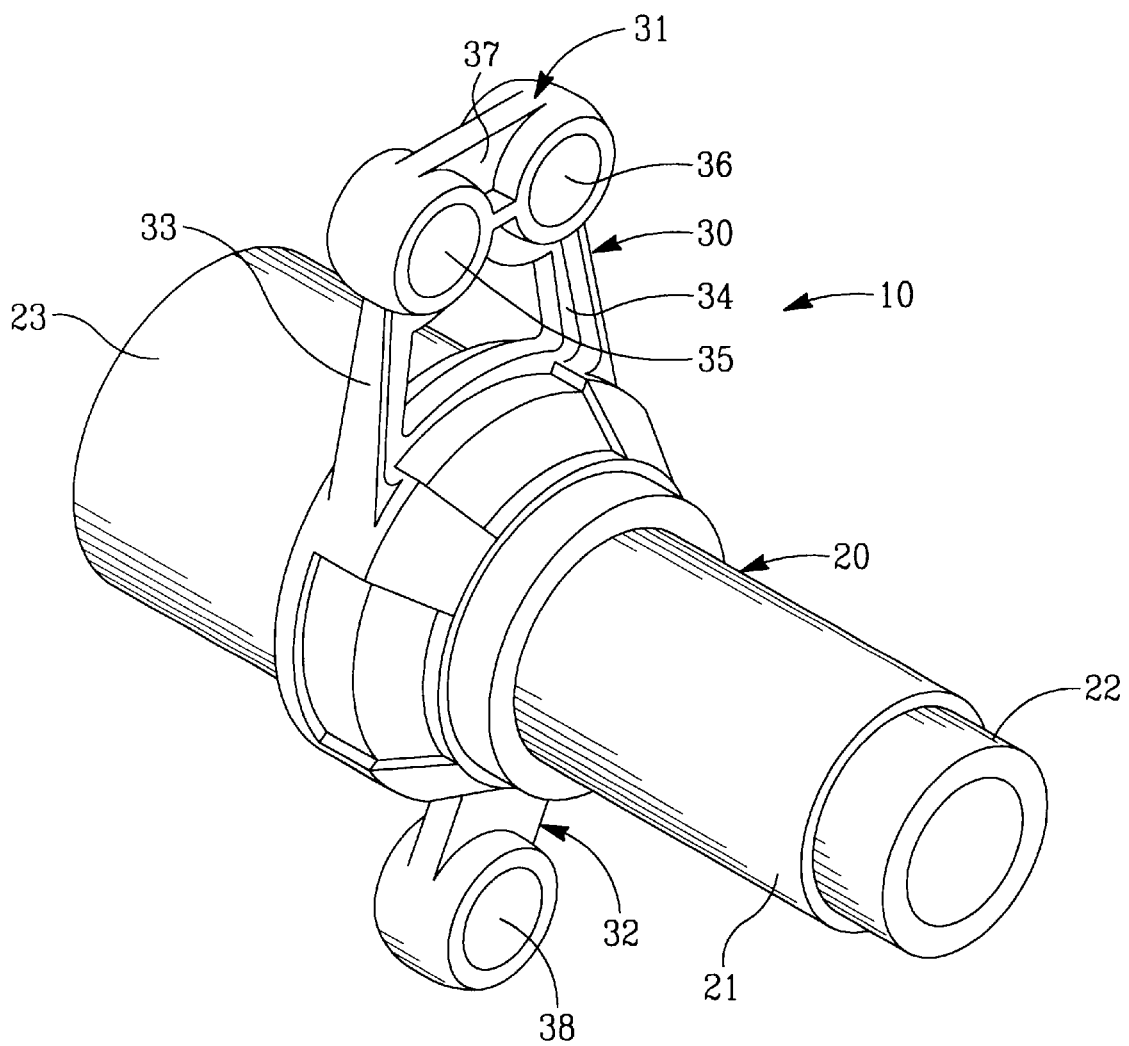
FIG. 2 is a perspective view of the integral axle spindle and brake spider assembly in accordance with the present invention.

Referring to FIG. 2 of the drawings, the integral axle spindle and brake spider assembly 10 comprises a one-piece part, manufactured preferably by forging, including an axle spindle 20 and a brake spider 30. The integral axle spindle and brake spider assembly 10 is manufactured from a single steel alloy billet as a one-piece forging.

Figure 1:
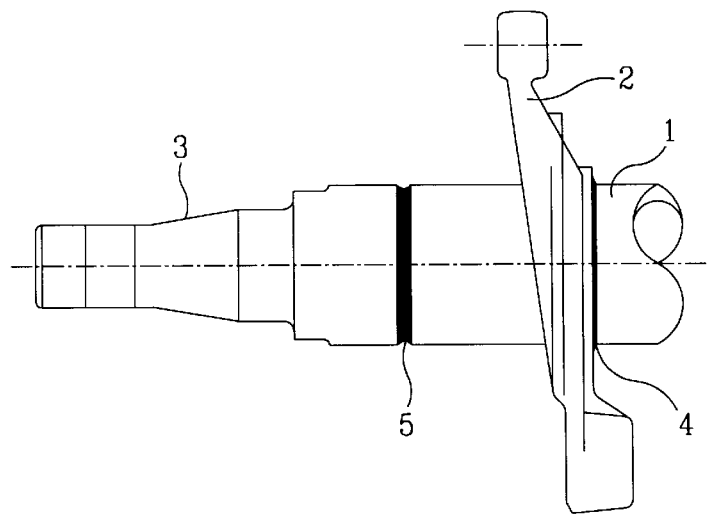
FIG. 1 is a side view of the axle spindle and brake spider of the prior art.
Figure 3:
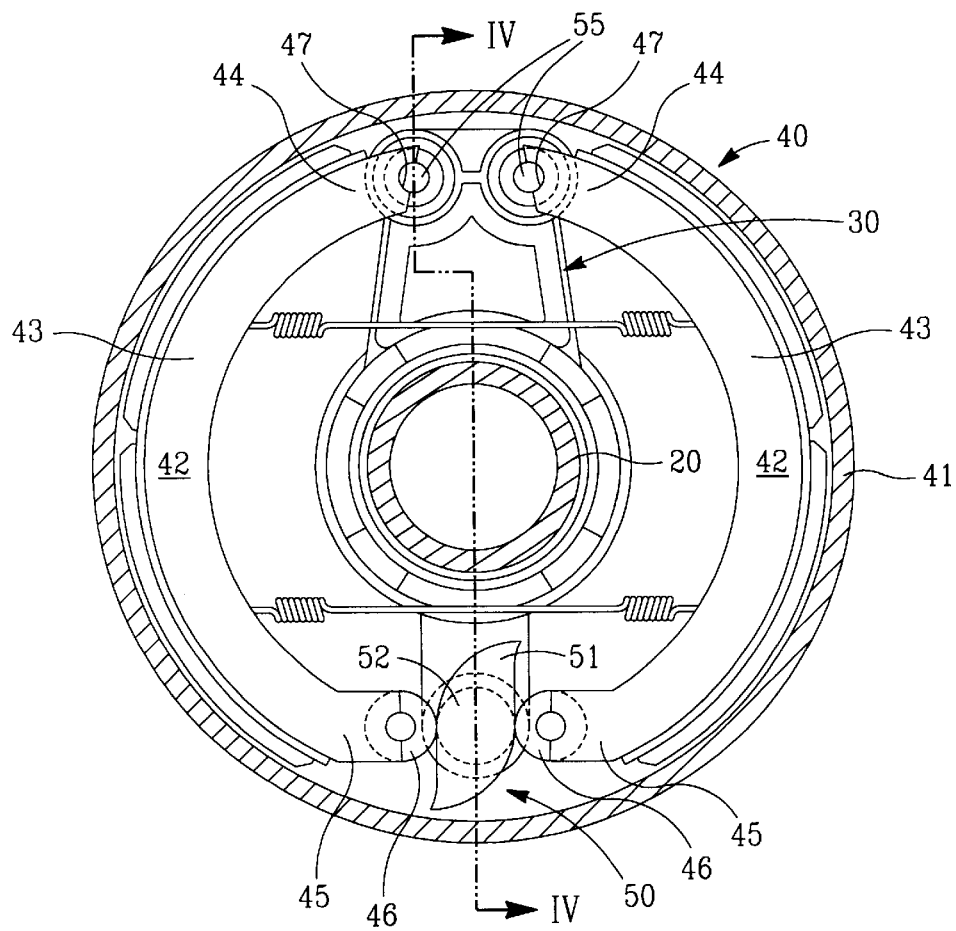
FIG. 3 is an end view of the drum brake assembly for the rear axle of the heavy duty trucks.

The assembly is adapted to be used with brake assemblies utilized in the heavy duty trucks or trailer axles, shown on FIG. 3. The brake assembly 40 for the rear axles of the heavy duty trucks typically includes a brake drum 41 mounted to a wheel (not shown) which is rotatably mounted on the spindle 20. The brake assembly for such heavy duty applications commonly utilizes a pair of brake shoes 42 each including a pair of axially spaced webs 43.

In order to selectively move the brake shoes 42 outwardly to create frictional engagement with the interior of the brake drum 41, a rotary actuator 50 is provided. The rotary actuator 50 includes an S-cam 51 rigidly secured to a cam shaft 52. The cam shaft is actuated by any appropriate means (not shown) which are well known in the brake art to cause the cam 51 to rotate outwardly displacing the brake shoes 42 for braking engagement with the interior surface of the drum 41. The brake shoes 42 commonly include cam followers 46 at an end 45 thereof adjacent to the cam 51 to allow smooth application of the force generated by the rotation of the cam 51 to each brake shoe 42.

An end 44 of the brake shoe 42 is designed to be supported for pivotal movement in response to the outward movement of the end 45 of the brake shoe 42 as it is selectively moved by the cam 51. The end 44 of each shoe 42 is provided with an open recess 47 in the shoe web 43 designed to receive a pivot pin 55.

Figure 4:
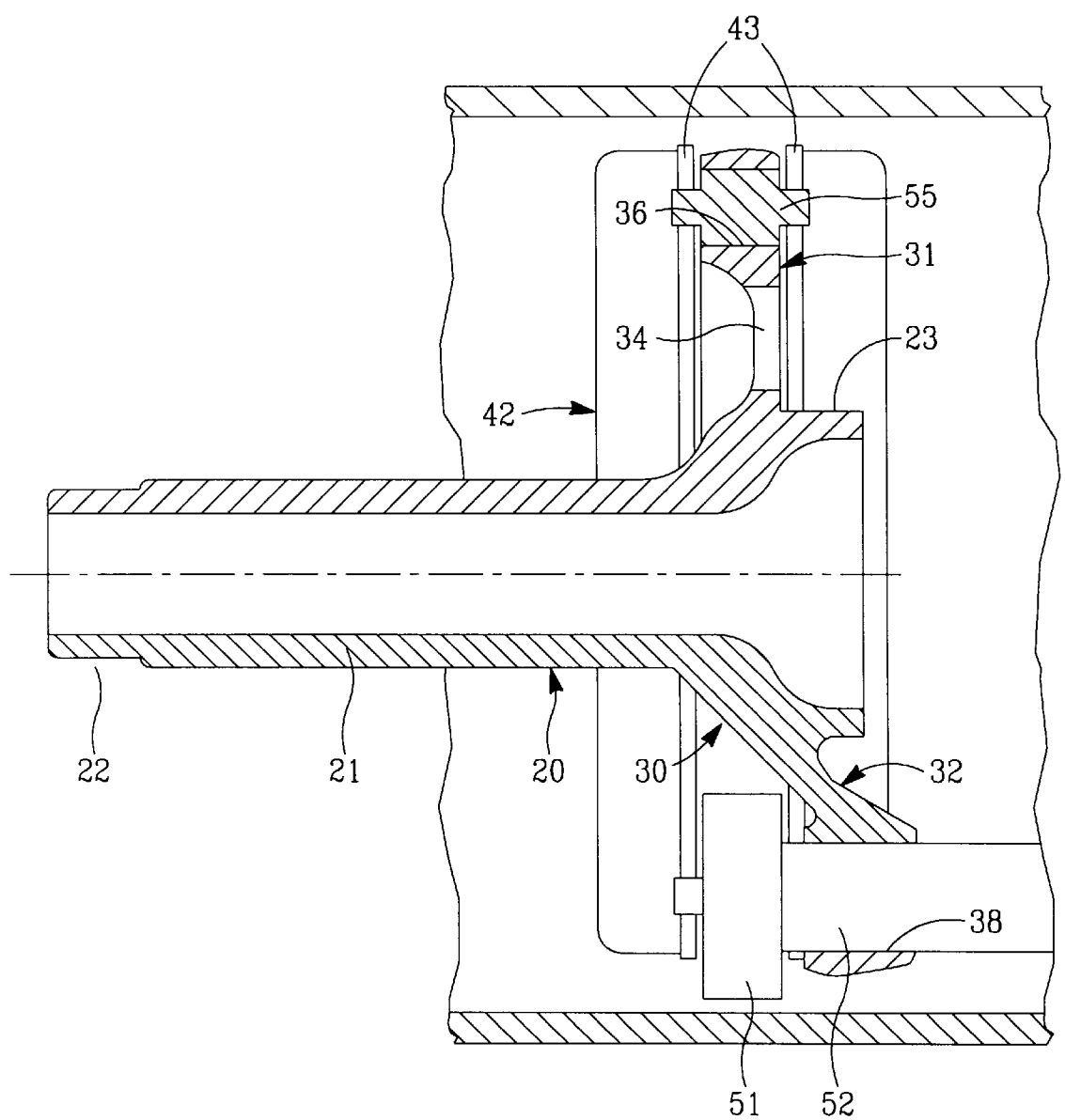
FIG. 4 is a cross-sectional view of the drum brake assembly including the integral axle spindle and brake spider assembly taken in the direction of arrows IV—IV in the FIG. 3.

The axle spindle 20, as illustrated on FIGS. 2 and 4, includes an elongated hollow generally cylindrical spindle body having a central portion 21, a spindle wheel end portion 22 and an axle tube end portion 23.

Extending radially outwardly from the central portion 21 of the spindle body is the brake spider 30. The spider 30 comprises a pivoting end support plate 31 and an actuator support plate 32.

The pivoting end support plate 31 is oriented to extend radially outwardly from the spindle body 21 so that it is generally perpendicular to the axis of the spindle body 21. The pivoting end support plate 31 is provided with a pair of pivot pin bores 35 and 36 receiving the pivot pins 55, which, in turn, extend from the opposite sides of the pivoting end support plate 31 of the spider 30 to be able to be received in the open recesses 47 in the shoe web 43 for pivotally supporting the brake shoes 42.

In the preferred embodiment, the pivoting end support plate 31 includes a pair of support arms 33 and 34 extending radially outwardly from the spindle body 21 so that they are generally perpendicular to the axis of the spindle body 21. Each of the support arms 33 and 34 is provided with the pivot pin bore 35 and 36 respectively. The ends of the support arms 33 and 34 are integrally interconnected in order to insure structural strength and integrity of the brake spider 30.

It should be noted that the brake spider of the present invention utilizes a pair of pivot pins for supporting one end of each brake shoe, as disclosed hereinabove. However, there are some drum brake configurations that employ a single centrally located pivot pin to support both brake shoes. it will be clear to those skilled in the art that the present invention could readily be employed for such brake assemblies. Although the specific forces acting on each plate of the brake spider might be different, there is sufficient information provided hereinabove to enable one with ordinary skills in the art to design such an integral spindle and brake spider assembly without departing from the scope of the invention.

The actuator support plate 32 extends generally opposite to the pivoting end support plate 31, and is provided with a support opening therethrough in the form of a circular opening 38 that supports the cam shaft 52 as the cam 51 extends from one end thereof to be centrally aligned with the brake shoes 42. The support opening 38 may be provided with any form of bushing or bearing well known in the art to allow free rotation of the cam shaft 52.

In the preferred embodiment, the actuator support plate 32 includes an actuator support bracket 38 provided with the circular opening 38 at the distal end thereof.

The actuator support plate 32 of the brake spider 30 is axially offset from the pivoting end support plate 31 in order to be aligned with the region adjacent to the brake actuator cam 51.

While in accordance with the provisions of the Patent Statutes the preferred embodiments of the present invention has been illustrated and described, it will be apparent to those of ordinary skill in the art that various changes, modifications or variations may be easily made without deviating from the scope of the invention.

What is claimed is:

1. An integrated one-piece axle spindle and a brake spider assembly for a brake assembly to be utilized in a heavy duty truck or trailer axle, said brake assembly including a brake drum mounted for rotation with a wheel at a wheel end portion of said axle and a pair of brake shoes including a web support structure, one end of said web support structure of each said brake shoes being supported by an anchor pin and the other end of said web support structure of each said brake shoes including means to be acted upon by a rotary S-cam brake actuator, said rotary brake actuator being supported adjacent said brake shoes at only a single support location, said integral axle spindle and a brake spider assembly comprising:

a brake spider adapted to support a brake assembly; said brake spider including a pivoting end support plate provided with at least one anchor pin bore, and an actuator support plate provided with an opening for supporting an S-cam shaft of said rotary brake actuator;

an axle spindle axially extending from said brake spider, said brake spider and said axle spindle both being formed from a single steel alloy billet as a one-piece forging.

2. The integrated one-piece axle spindle and a brake spider assembly as defined in claim 1, wherein said actuator support plate of said brake spider, is axially offset from said pivoting end support plate.

3. The integrated one-piece axle spindle and a brake spider assembly as defined in claim 1, wherein said pivoting end support plate comprises two spaced support arms radially outwardly extending from said axle spindle in the direction opposite to said actuator support plate, each of said support arms is provided with an anchor pin bore; said support arms being integrally interconnected at the distal ends thereof.

4. The integrated one-piece axle spindle and a brake spider assembly as defined in claim 1, wherein said axle spindle is a hollow member.

5. The integrated one-piece axle spindle and a brake spider assembly as defined in claim 1, wherein said pivoting end support plate is provided with two anchor pin bores.

6. The integrated one-piece axle spindle and a brake spider assembly as defined in claim 1, wherein said pivoting end support plate is provided with a single anchor pin bore.

7. An integrated one-piece axle spindle and a brake spider assembly for a brake assembly to be utilized in a heavy duty truck or trailer axle, said brake assembly including a brake drum mounted for rotation with a wheel at a wheel end portion of said axle and a pair of brake shoes including a web support structure, one end of said web support structure of each said brake shoes being supported by an anchor pin and the other end of said web support structure of each said brake shoes including means to be acted upon by a rotary S-cam brake actuator, said rotary brake actuator being supported adjacent said brake shoes at only a single support location, said integral axle spindle and a brake spider assembly comprising:

an axle spindle comprising an elongated hollow generally cylindrical spindle body having a spindle wheel end portion, a central portion, and an axle tube end portion;

a brake spider adapted to support a brake assembly; said brake spider including a pivoting end support plate provided with an anchor pin bore for mounting said brake shoes by means of said anchor pin, and an actuator support plate; said pivoting end support plate and said actuator support plate extend outwardly from opposite sides of said central portion of said axle spindle;

said actuator support plate including an actuator support bracket provided with an opening at the distal end thereof for supporting an S-cam shaft of said rotary brake actuator;

said actuator support bracket of said brake spider being axially offset from said pivoting end support plate;

said brake spider and said axle spindle both being formed from a single steel alloy billet as a one-piece forging.

* * * * *